(12) United States Patent
Suh (10) Patent No.: US 12,505,672 B2
(45) Date of Patent: Dec. 23, 2025

(54) DISTRIBUTED PROCESSING METHOD AND APPARATUS INTERACTING WITH CLIENT

(71) Applicant: paymentinApp Inc., Seoul (KR)

(72) Inventor: Jung Hyung Suh, Seoul (KR)

(73) Assignee: paymentinApp Inc., Seoul (KR)

( * ) Notice: Subject to any disclaimer, the term of this patent is extended or adjusted under 35 U.S.C. 154(b) by 0 days.

(21) Appl. No.: 18/736,420

(22) Filed: Jun. 6, 2024

(65) Prior Publication Data

US 2025/0342694 A1 Nov. 6, 2025

(30) Foreign Application Priority Data

May 3, 2024 (KR) .................. 10-2024-0059396

(51) Int. Cl.
| | |
|---|---|
| *G06V 20/40* | (2022.01) |
| *G06V 10/94* | (2022.01) |
| *G06V 20/52* | (2022.01) |
| *G06V 40/16* | (2022.01) |

(52) U.S. Cl.
CPC .............. *G06V 20/44* (2022.01); *G06V 10/95* (2022.01); *G06V 20/52* (2022.01); *G06V 40/171* (2022.01)

(58) Field of Classification Search
CPC ........ G06V 10/95; G06V 20/44; G06V 20/52; G06V 40/171
See application file for complete search history.

(56) References Cited

U.S. PATENT DOCUMENTS

| | | | |
|---|---|---|---|
| 2008/0183622 A1* | 7/2008 | Dixon ................ | G06Q 20/0855 705/44 |
| 2019/0325198 A1* | 10/2019 | Friedland ............. | G08B 13/196 |
| 2020/0160301 A1* | 5/2020 | Lyman ...................... | G06T 7/10 |
| 2021/0011986 A1* | 1/2021 | Tussy ...................... | G06V 40/67 |
| 2022/0012362 A1* | 1/2022 | Kuta ..................... | G06V 10/758 |
| 2022/0035950 A1* | 2/2022 | Wakabayashi ...... | G06F 12/1408 |
| 2024/0062467 A1* | 2/2024 | Sarkis .................... | G06V 10/82 |
| 2024/0144141 A1* | 5/2024 | Cella .................. | G06Q 30/0206 |
| 2024/0386423 A1* | 11/2024 | Maitra ................. | G06Q 20/389 |

FOREIGN PATENT DOCUMENTS

GB 2594463 A * 11/2021 ............... H04N 7/18

* cited by examiner

*Primary Examiner* — Peet Dhillon (57) ABSTRACT

A distributed processing apparatus connected to one or more clients through a network includes a communication unit that receives, from the one or more clients, preprocessing information on a video of a target space input from the one or more clients, and location information and attribute information on one or more objects of interest included in the target space; a storage unit that stores at least one of the preprocessing information, the location information, and the attribute information; and an information processing unit that generates visualization information on the one or more objects or performs inference by a heat map or a digital twin method using the stored information.

9 Claims, 6 Drawing Sheets

DISTRIBUTED PROCESSING METHOD AND APPARATUS INTERACTING WITH CLIENT

CROSS-REFERENCE TO RELATED APPLICATION

This application claims priority under 35 U.S.C. § 119 of Korean Patent Application No. 10-2024-0059396 filed on May 3, 2024, the entire contents of which are incorporated herein by reference.

BACKGROUND

(a) Technical Field

The present disclosure relates to a distributed processing method and apparatus interacting with a client.

(b) Background Art

Recently, as CCTV has become widespread, videos are being captured in various spaces.

For example, the installation of CCTV is mandatory for the purpose of monitoring the occurrence of safety accidents in public transportation such as buses, but sizes of images taken on site are large capacity, so the images are usually stored internally rather than transmitted to a server.

When videos and additional information captured in various spaces are transmitted to a centralized server, the videos and additional information may be used to establish various policies such as emergency situation judgment, urban planning, and transportation planning, but no specific research to solve this problem has been conducted yet.

Furthermore, privacy protection issues may arise when transmitting videos included in the field, so research to supplement these issues is also essential.

SUMMARY OF THE DISCLOSURE

In order to solve the problems of the prior art described above, the present disclosure seeks to propose a distributed processing method and apparatus interacted with a client capable of increasing data transmission efficiency and improving security.

To accomplish the above object, according to the present disclosure, the distributed processing apparatus connected to one or more clients through a network includes a communication unit that receives, from the one or more clients, preprocessing information on a video of a target space input from the one or more clients, and location information and attribute information on one or more objects of interest included in the target space; a storage unit that stores at least one of the preprocessing information, the location information, and the attribute information; and an information processing unit that generates visualization information on the one or more objects or performs inference by a heat map or a digital twin method using the stored information.

The preprocessing information may include at least one of a cropped video of the one or more objects of interest, a grayscale conversion video of the video, and a blurred video.

The location information may include at least one of GPS information and indoor relative coordinate information on the one or more objects of interest.

The attribute information may include at least one of face image numerical information, gender, age, and payment-related information on face images of one or more people included in the target space.

The face image numerical information may be extracted using vector information of landmarks extracted from face images of one or more people, and the gender and age information may be calculated by comparing data stored in a database based on the face image numerical information.

When the target space is public transportation, the payment-related information may be a virtual number obtained by hashing a number of a payment medium.

The payment-related information may convert a payment medium issuer identification number of the payment medium into the virtual number using one of a plurality of matching tables, and a number obtained by hashing the converted virtual number and the remaining serial number of the payment medium may be a hashed primary account number (PAN) of the payment medium.

The information processing unit may use the face image numerical information and the age and gender information extracted through the face image numerical information to establish traffic and urban policies by considering an amount of movement, an age group, a movement area, etc., of passengers for each time and route.

The communication unit may receive the preprocessing information on the video, and the location information and the attribute information on one or more objects of interest included in the target space at a preset period or when a preset event occurs, and the information processing unit may perform big data analysis using information received from the one or more clients at different times.

The communication unit may receive the preprocessing information on the video, the location information and the attribute information on the one or more objects of interest included in the target space at each station of the public transportation.

When the preset event occurs and the preprocessing information on the video, and the location information and the attribute information on the one or more objects of interest included in the target space are received, the information processing unit may calculate a relative distance between the objects of interest to determine whether a theft or molestation incident occurs within the target space.

According to another aspect of the present disclosure, a distributed processing apparatus in a server connected to one or more clients through a network includes: receiving, from the one or more clients, preprocessing information on a video of a target space input from the one or more clients, and location information and attribute information on one or more objects of interest included in the target space; storing at least one of the preprocessing information, the location information, and the attribute information; and generating visualization information on the one or more objects or performing inference by a heat map or a digital twin method using the stored information.

According to the present disclosure, since the client side selectively transmits the preprocessed or extracted information to a server, it is possible to improve the data transmission efficiency.

In addition, according to the present disclosure, because identification information about a person is virtualized and transmitted to the server, it is possible to protect personal privacy.

DETAILED DESCRIPTION

Since the present disclosure may be variously modified and have several exemplary embodiments, specific exemplary embodiments will be illustrated in the accompanying drawings and be described in detail in a detailed description. However, it is to be understood that the present disclosure is not limited to a specific embodiment, but includes all modifications, equivalents, and substitutions included within the technical scope and spirit of the present disclosure.

Terms used in the present specification are used only to describe specific exemplary embodiments rather than to limit the present disclosure. Singular forms include plural forms unless the context clearly indicates otherwise. It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

In addition, components of the embodiments described with reference to each drawing are not limitedly applied only to the corresponding embodiment, and may be implemented to be included in other embodiments within the scope of maintaining the technical spirit of the present disclosure. In addition, it goes without saying that these components may also be re-implemented as one embodiment in which a plurality of embodiments are integrated, even if a separate description is omitted.

In addition, in the description with reference to the accompanying drawings, regardless of reference numerals, the same components will be given the same or related reference numerals and duplicate description thereof will be omitted. When it is decided that the detailed description of the known art related to the present disclosure may unnecessarily obscure the gist of the present disclosure, a detailed description therefor will be omitted.

Figure 1:
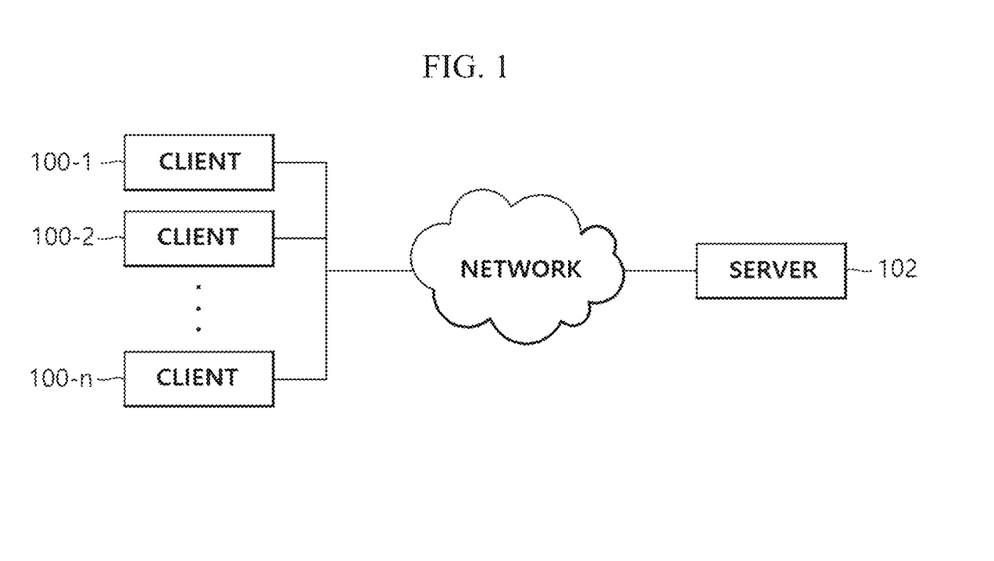
FIG. 1 is a diagram showing a configuration of a distributed processing system interacting with a client according to an embodiment of the present disclosure.

FIG. 1 is a diagram showing a configuration of a distributed processing system interacting with a client according to an embodiment of the present disclosure.

As shown in FIG. 1, the distributed processing system according to the present embodiment may include one or more clients 100-1 . . . 100-n (hereinafter collectively referred to as '100') and a server 102 connected to one or more clients 100 through a network.

Here, the network may include all wired and wireless Internet networks, satellite networks, and mobile communication networks.

In addition, the server 102 may include an on-premises or cloud server.

According to the present embodiment, one or more clients 100 receive video captured through a camera (not shown), process the input video, and transmit the processed video to the server 102.

The client 100 may be defined as a thin client.

Here, the thin client 100 is defined as a computer or computer program that greatly relies on some other computers to fulfill its computational role.

The server 102 stores video received from one or more clients 100 and generates condensed visualization information on a target space or performs inference using information provided from the clients 100 depending on the necessary purpose.

The client 100 may receive video captured from one or more cameras installed in public transportation such as a bus or subway, or a target space such as a road, process the video, and transmit the processed video to the server 102.

Here, the camera may be CCTV or a security camera.

In addition, the client 100 may process a video captured from a camera attached to a collaborative robot and transmit the processed video to the server 102.

Figure 2:
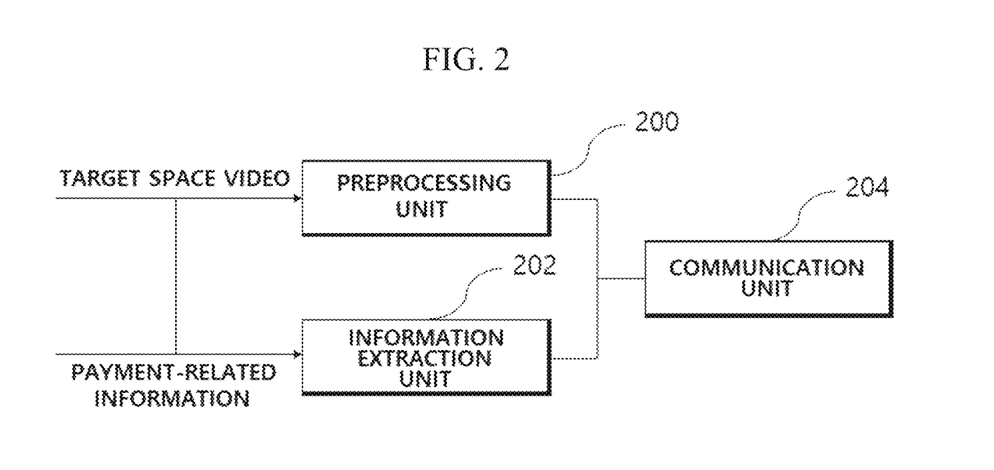
FIG. 2 is a diagram showing a detailed configuration of a client according to an embodiment of the present disclosure.

FIG. 2 is a diagram showing a detailed configuration of a client according to an embodiment of the present disclosure.

As shown in FIG. 2, the client 100 may include a preprocessing unit 200, an information extraction unit 202, and a communication unit 204.

The preprocessing unit 200 preprocesses the video input from the camera installed in the target space.

Here, the preprocessing is to reduce the size of the video to be transmitted to the server 102, and may include a process of identifying one or more objects of interest (e.g., people) included in the target space, cropping the identified one or more objects of interest as a region of interest (ROI), or a process of performing grayscale conversion and blur processing to reduce resolution.

The information extraction unit 202 extracts location information and attribute information on one or more objects of interest using video and payment-related information for the target space.

Here, the location information may be GPS information on one or more objects of interest or relative coordinate information indoors.

In the case of an outdoor space, the information extraction unit 202 may extract the GPS information on the object of interest based on the GPS information from a camera installed in the target space, and in the case of an indoor space such as a bus/subway or an inside of a building, relative indoor coordinate information, such as seat information, may be extracted using WiFi, Bluetooth low energy (BLE), or sensors.

In addition, coordinates may be estimated by a perspective transform technique using the video information input from the camera, or relative coordinate information may be estimated independently using a 3D depth camera that can measure x/y/z coordinates or may be used for verification of other position measurements described above.

FIG. 3 exemplarily shows the location information in the bus space, and the information extraction unit 202 may extract information on seats where passengers are sitting in a bus as illustrated below in FIG. 3 from the video of the target space as illustrated above in FIG. 3.

When the object of interest is a person, the attribute information may include at least one of face image numerical information, gender, age, and payment-related information for one or more people included in the target space.

Figure 4:
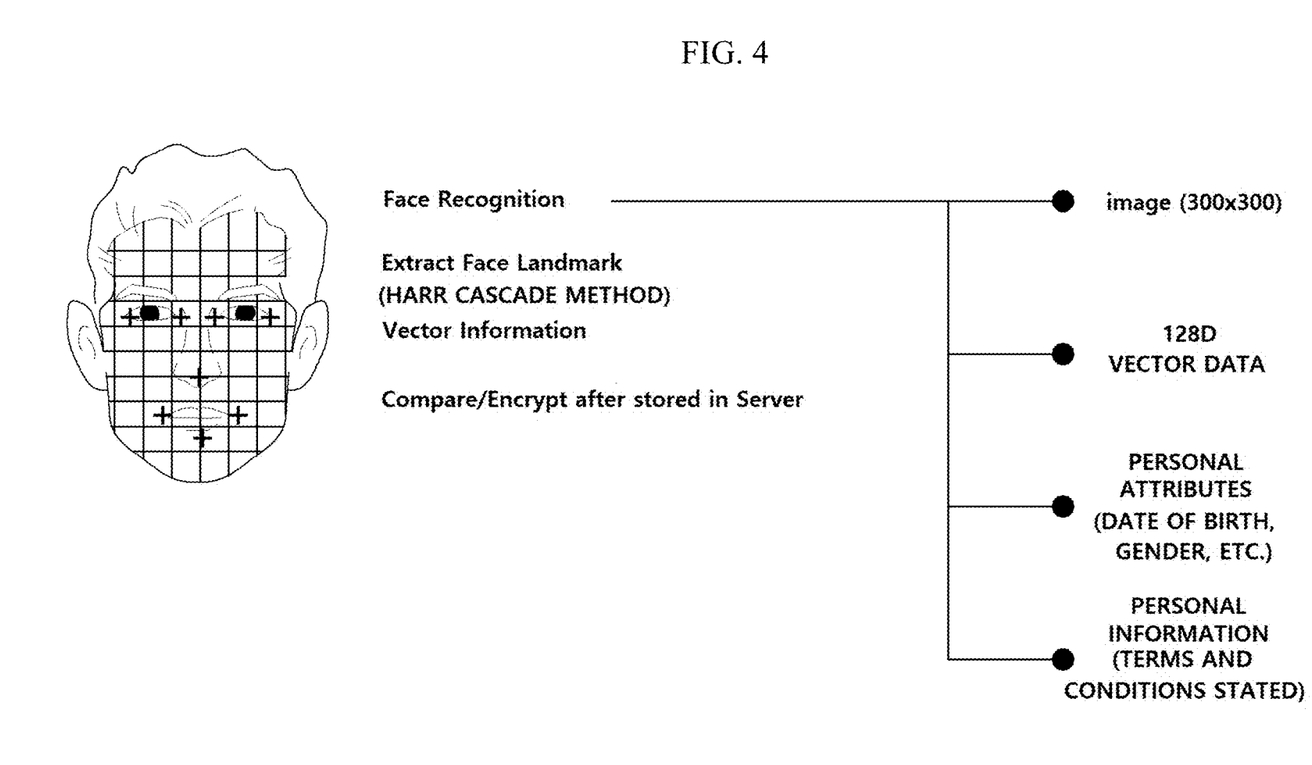
FIG. 4 is a diagram exemplarily showing a process of extracting face image numerical information according to an embodiment of the present disclosure.

FIG. 4 is a diagram exemplarily showing a process of extracting face image numerical information according to an embodiment of the present disclosure.

As shown in FIG. 4, the information extraction unit 202 may be information such as 128D or an eye aspect ratio (EAR) extracted using vector information of landmarks extracted from face images, and the gender and age information may be extracted by comparing the information stored in the database based on the numerical information extracted as described above.

In this case, after the face image numerical information is extracted by the information extraction unit 202, an original image of a face is immediately destroyed.

Although it has been described above that the face image numerical information is performed by the client 100, the present disclosure is not limited to this, and the face image may be received and processed by the server 102.

In addition, when the target space is the public transportation such as a bus, the information extraction unit 202 may extract a virtual number obtained by hashing a number of a payment medium as payment-related information.

In general, a number assigned to a card may include a card company's unique identification number (bank identification number (BIN)), a serial number (primary No.) assigned to a card product, and a number (check sum) for identifying validity of a card.

The client 100 stores approval details for a payment medium through an offline payment system. At this time, the primary account number (PAN) of the payment medium is hashed rather than stored directly.

The client 100 converts a common identification number (CIN), which is a unique number of a payment medium issuer of the recognized payment medium, into a virtual number using a matching table that stores the virtual number of the payment medium issuer, and stores the hashed number of the converted virtual number and the remaining serial number of the payment medium as the hashed PAN of the payment medium.

There may be a plurality of matching tables with different unique numbers, and the client 100 selects one of the plurality of matching tables and converts the CIN into the virtual number through the selected matching table.

Figure 5:
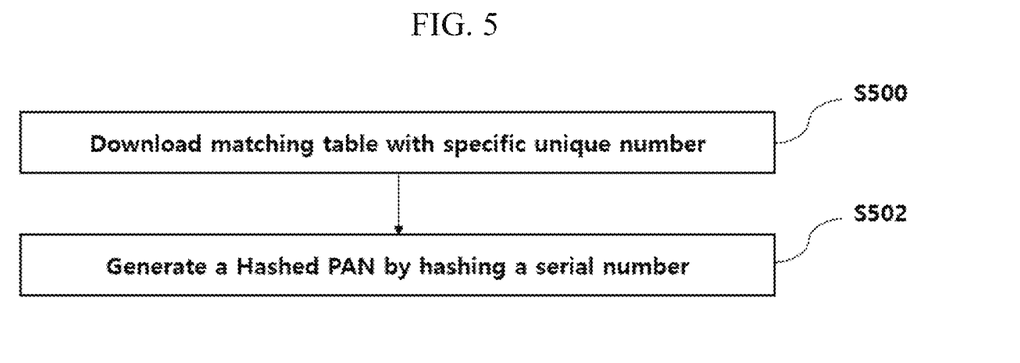
FIG. 5 is a diagram describing a virtual number conversion process according to an embodiment of the present disclosure.

FIG. 5 is a diagram describing a virtual number conversion process according to an embodiment of the present disclosure.

Referring to FIG. 5, according to the present embodiment, a matching table having a unique number, which stores an Alias number instead of the CIN, is used.

The matching table has a unique number and a number (Unique ID) corresponding to the CIN.

For example, in the case where a payment medium with a PAN of 510005 0110000100 is used, when the CIN of virtual number 5 is 510005 in a matching table with a unique number called 1F8X, the client 100 refers to the matching table of 1F8X, downloads a matching table with a unique number called 1F8X (S500), and generates a hashed PAN by hashing the remaining serial number (0110000100) (S502).

In the end, when the 510005 0110000100 card is used, the match table information with the unique number called 1F8X is looked at, and UID 5 corresponding to the CIN and an 8-digit Hashed PAN value of the serial number are collected to complete the encrypted media number encryption and are hashed as follows.

82c24e545be1b3dd37a13fdbfb18f07b983ff3a68857f156 8f2d9d11ac84df39 1F8X 5

Figure 6:
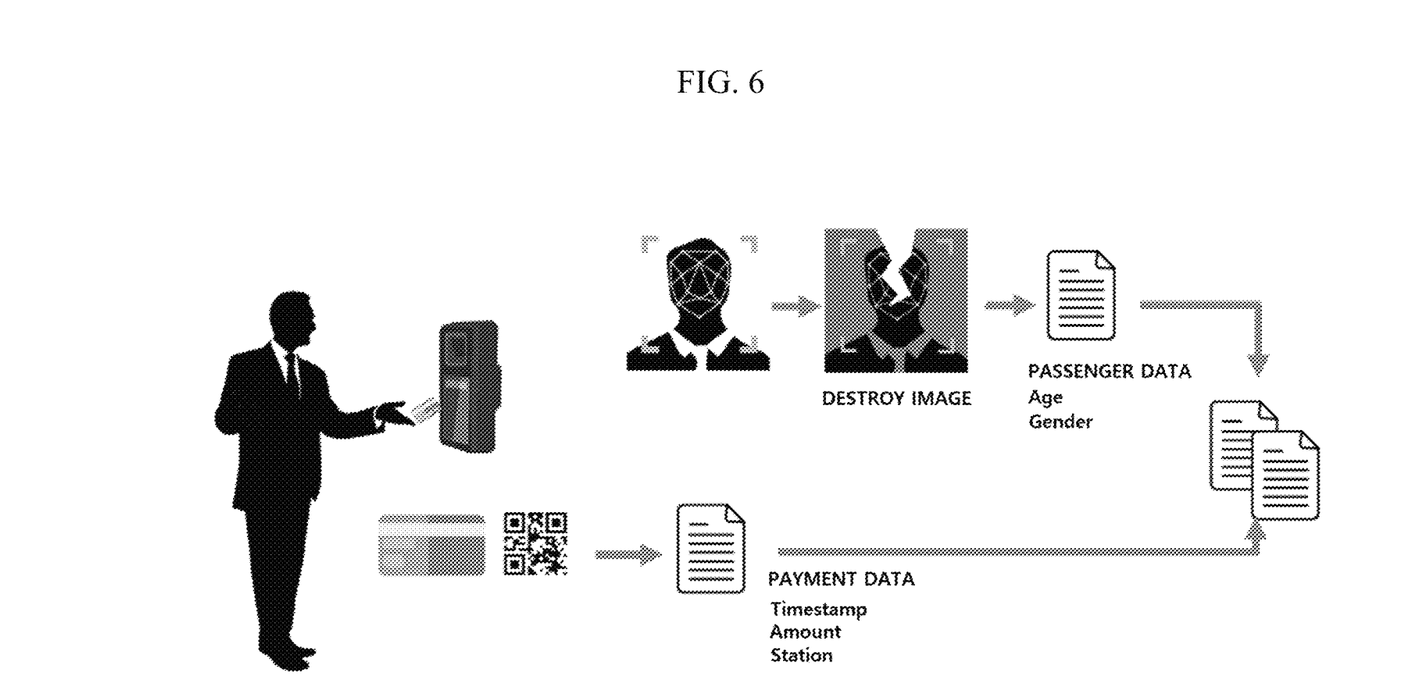
FIG. 6 is a diagram showing a process of matching payment data and passenger data according to an embodiment of the present disclosure.

FIG. 6 is a diagram showing a process of matching payment data and passenger data according to an embodiment of the present disclosure.

As shown in FIG. 6, the information extraction unit 202 may match the payment-related information (payment data) with the face image (passenger data).

The communication unit 204 transmits the preprocessing information obtained by the preprocessing unit 200 or the location information and the attribute information extracted by the information extraction unit 202 to the server 102.

Figure 7:
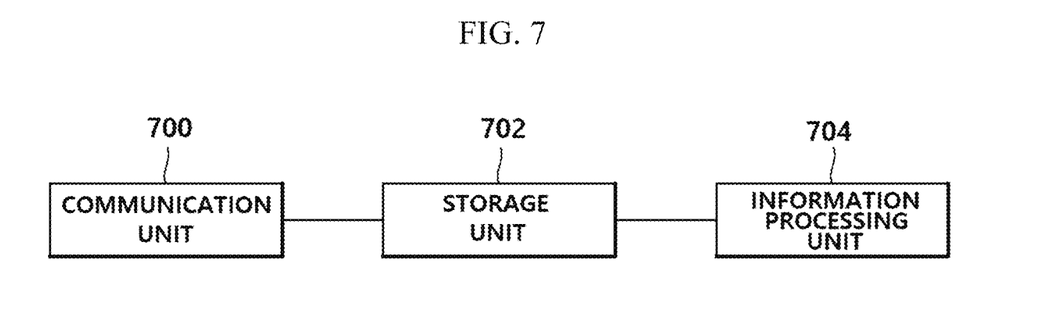
FIG. 7 is a diagram showing a detailed configuration of a server according to an embodiment of the present disclosure.

FIG. 7 is a diagram showing a detailed configuration of a server according to an embodiment of the present disclosure.

Referring to FIG. 7, a server 102 according to the present embodiment may include a communication unit 700, a storage unit 702, and an information processing unit 704.

The communication unit 700 receives the preprocessing information, the location information, and the attribute information from one or more clients 100.

In this case, the communication unit 700 may receive the preprocessing information on the video, and the location information and the attribute information on the one or more objects of interest included in the target space at a preset period or when a preset event occurs.

Here, the preset event may include an abnormal situation in the target space or a station stop situation in the case of the public transportation, for example, the number of people getting on and off, a stop time, etc.

The communication unit 700 may include time information on information transmitted from the client 100, and the storage unit 702 stores the preprocessing information, the location information, and the attribute information on a client and time basis.

The information processing unit 704 uses the stored information to generate the visualization information or perform the inference process according to the purpose.

The information processing unit 704 may generate the visualization information on the one or more objects by a heat map or a digital twin method using the preprocessing information, the location information, and the attribute information.

Figure 3:
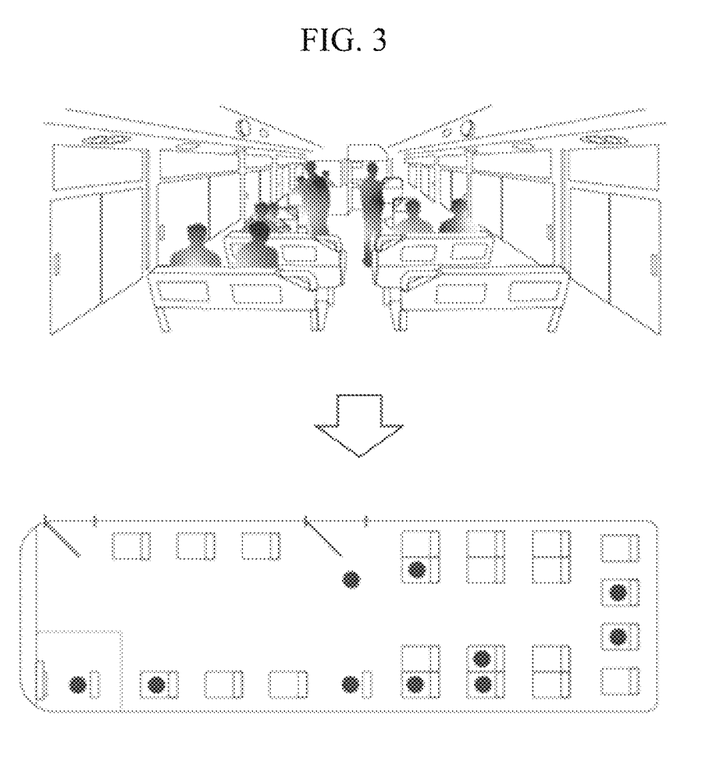
FIG. 3 is a diagram exemplarily showing location information in a bus space.

Here, the visualization information may include implied information as illustrated in FIG. 3 about the target space.

In addition, the information processing unit 704 according to the present embodiment may perform big data analysis for establishing traffic policies and urban policies.

For example, when the stored information is bus-related information, the face image numerical information and the age and gender information extracted through the face image numerical information are used to establish the traffic policy and the urban policy by considering an amount of movement, an age group, a movement area, etc., of passengers for each time and route.

In addition, according to the present disclosure, when the preset event occurs and the preprocessing information on the video, and the location information and the attribute information on the one or more objects of interest included in the target space are received, the information processing unit 704 may calculate a relative distance between the objects of interest to determine whether a theft or molestation incident occurs within the target space.

For example, when it is determined that the theft or molestation situation has occurred within a crowded target space, the client 100 may transmit the preprocessed information and extracted information to the server 102, and the information processing unit 704 of the server 102 may use the received information to extract information on passengers adjacent to anyone who has been stolen or molested and transmit the extracted information to a police or government office.

In this way, the distributed processing method according to the present embodiment may increase data transmission efficiency by transmitting only necessary data to the server and allowing the server to generate the visualization information and perform the inference according to the required purpose, and in addition, may also protect personal privacy by virtualizing identification information of a person and transmitting the virtualized identification information to the server.

The above-described distributed processing method may also be implemented in the form of a recording medium including program instructions executable by a computer, such as an application or program module executed by the computer. The program instructions may be stored in memory connected to the processor. A computer-readable medium may be any available media that may be accessed by a computer and includes both volatile and nonvolatile media and removable and non-removable media. Also, the computer-readable medium may include computer storage media. The computer storage medium includes both volatile and nonvolatile and removable and non-removable media implemented in any method or technology for storage of information such as computer-readable instructions, data structures, program modules, or other data.

The embodiments of the present disclosure described above have been disclosed for illustrative purposes, and those skilled in the art with ordinary knowledge of the present disclosure will be able to make various modifications, changes, and additions within the spirit and scope of the present disclosure, and these modifications, changes, and additions should be regarded as falling within the scope of the following claims.

What is claimed is:

1. A distributed processing apparatus connected to one or more clients through a network, comprising:
    a communication unit that receives, from the one or more clients, preprocessing information on a video of a target space input from the one or more clients, and location information and attribute information on one or more objects of interest included in the target space;
    a storage unit that stores at least one of the preprocessing information, the location information, and the attribute information; and
    an information processing unit that generates visualization information on the one or more objects of interest or performs inference by a heat map or a digital twin method using the stored information,
    wherein the attribute information includes at least one of face image numerical information, gender, age, and payment-related information for one or more people included in the target space,
    wherein when the target space is public transportation, the payment-related information is a virtual number obtained by hashing a number of a payment medium, and
    wherein the payment-related information converts a payment medium issuer identification number of the payment medium into the virtual number using one of a plurality of matching tables, and a number obtained by hashing the converted virtual number and remaining serial number of the payment medium is a hashed primary account number (PAN) of the payment medium.

2. The distributed processing apparatus of claim 1, wherein the preprocessing information includes at least one of a cropped video of the one or more objects of interest, a grayscale conversion video of the video, and a blurred video.

3. The distributed processing apparatus of claim 1, wherein the location information includes at least one of GPS information and indoor relative coordinate information on the one or more objects of interest.

4. The distributed processing apparatus of claim 1, wherein the face image numerical information is extracted using vector information of landmarks extracted from face images of the one or more people, and
    the gender and age information are calculated by comparing data stored in a database based on the face image numerical information.

5. The distributed processing apparatus of claim 1, wherein the information processing unit uses the face image numerical information and the age and gender information extracted through the face image numerical information to establish traffic and urban policies by considering an amount of movement, an age group, and a movement area of passengers for each time and route.

6. The distributed processing apparatus of claim 1, wherein the communication unit receives the preprocessing information on the video, and the location information and the attribute information on the one or more objects of interest included in the target space at a preset period or when a preset event occurs, and
    the information processing unit performs big data analysis using information received from the one or more clients at different times.

7. The distributed processing apparatus of claim 6, wherein the communication unit receives the preprocessing information on the video, and the location information and the attribute information on the one or more objects of interest included in the target space at each station of the public transportation.

8. The distributed processing apparatus of claim 6, wherein when the preset event occurs and the preprocessing information on the video, and the location information and the attribute information on the one or more objects of interest included in the target space are received, the information processing unit calculates a relative distance between the objects of interest to determine whether a theft or molestation incident occurs within the target space.

9. A distributed processing apparatus in a server connected to one or more clients through a network, comprising:
    receiving, from the one or more clients, preprocessing information on a video of a target space input from the one or more clients, and location information and attribute information on one or more objects of interest included in the target space;
    storing at least one of the preprocessing information, the location information, and the attribute information; and
    generating visualization information on the one or more objects of interest or performing inference by a heat map or a digital twin method using the stored information,
    wherein the attribute information includes at least one of face image numerical information, gender, age, and payment-related information for one or more people included in the target space,
    wherein when the target space is public transportation, the payment-related information is a virtual number obtained by hashing a number of a payment medium, and wherein the payment-related information converts a payment medium issuer identification number of the payment medium into the virtual number using one of a plurality of matching tables, and a number obtained by hashing the converted virtual number and remaining serial number of the payment medium is a hashed primary account number (PAN) of the payment medium.

* * * * *